(12) United States Patent
Ishikawa

(10) Patent No.: US 9,886,106 B2
(45) Date of Patent: Feb. 6, 2018

(54) INPUT DEVICE, AND ELECTRONIC INFORMATION BOARD SYSTEM

(71) Applicant: Naoyuki Ishikawa, Kanagawa (JP)

(72) Inventor: Naoyuki Ishikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 9 days.

(21) Appl. No.: 14/887,691

(22) Filed: Oct. 20, 2015

(65) Prior Publication Data
US 2016/0116998 A1 Apr. 28, 2016

(30) Foreign Application Priority Data
Oct. 28, 2014 (JP) ................. 2014-219161

(51) Int. Cl.
| | |
|---|---|
| G06F 3/0354 | (2013.01) |
| G06F 3/041 | (2006.01) |
| G06F 3/0362 | (2013.01) |
| G06F 3/03 | (2006.01) |
| G06F 3/038 | (2013.01) |
| G06F 3/042 | (2006.01) |

(52) U.S. Cl.
CPC ........ G06F 3/03545 (2013.01); G06F 3/0312 (2013.01); G06F 3/0383 (2013.01); G06F 3/0386 (2013.01); G06F 3/03542 (2013.01); G06F 3/0421 (2013.01)

(58) Field of Classification Search
CPC .... G06F 3/03545; G06F 3/033; G06F 3/0362; G06F 3/0354; G06F 3/041; G06F 3/04883; G06F 3/0317; G06F 1/1626; G06F 3/0312; G06F 3/0383; G06F 3/0386; G06F 3/0421; G06F 3/03542
See application file for complete search history.

(56) References Cited

U.S. PATENT DOCUMENTS

| | | | | |
|---|---|---|---|---|
| 2004/0041798 | A1* | 3/2004 | Kim ..................... | G06F 1/1626 345/179 |
| 2004/0100456 | A1* | 5/2004 | Wang .................. | G06F 3/03543 345/179 |
| 2005/0162390 | A1* | 7/2005 | Selby ................... | G06F 3/0312 345/163 |
| 2007/0155502 | A1* | 7/2007 | Wu ........................ | A63F 13/10 463/37 |
| 2007/0279399 | A1* | 12/2007 | Nishimura .......... | G06F 3/03546 345/179 |
| 2011/0298709 | A1* | 12/2011 | Vaganov ............. | G06F 3/03546 345/158 |
| 2014/0218344 | A1 | 8/2014 | Kuwata | |

FOREIGN PATENT DOCUMENTS

| | | |
|---|---|---|
| JP | 2002-163070 | 6/2002 |
| JP | 2014-149760 | 8/2014 |

\* cited by examiner

*Primary Examiner* — Saiful A Siddiqui
(74) *Attorney, Agent, or Firm* — Oblon, McClelland, Maier & Neustadt, L.L.P.

(57) ABSTRACT

An input device includes a casing, a moveable unit disposed in the casing and including a spherical object and a rotation detector for detecting a rotation of the spherical object contactable on a display face, and a transmitter, disposed in the casing, to receive a rotation detection signal from the rotation detector and to transmit the rotation detection signal when the rotation detector detects the rotation of the spherical object.

9 Claims, 11 Drawing Sheets

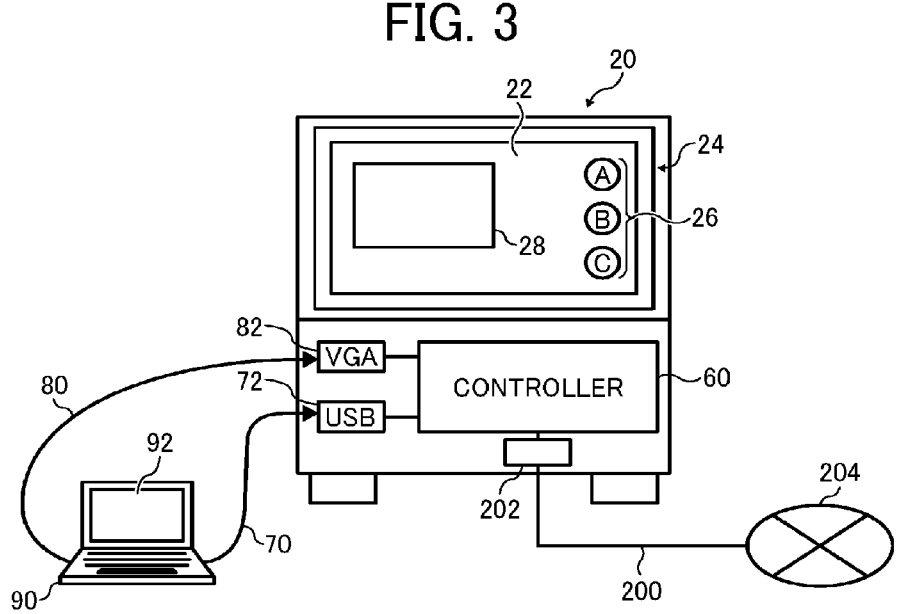
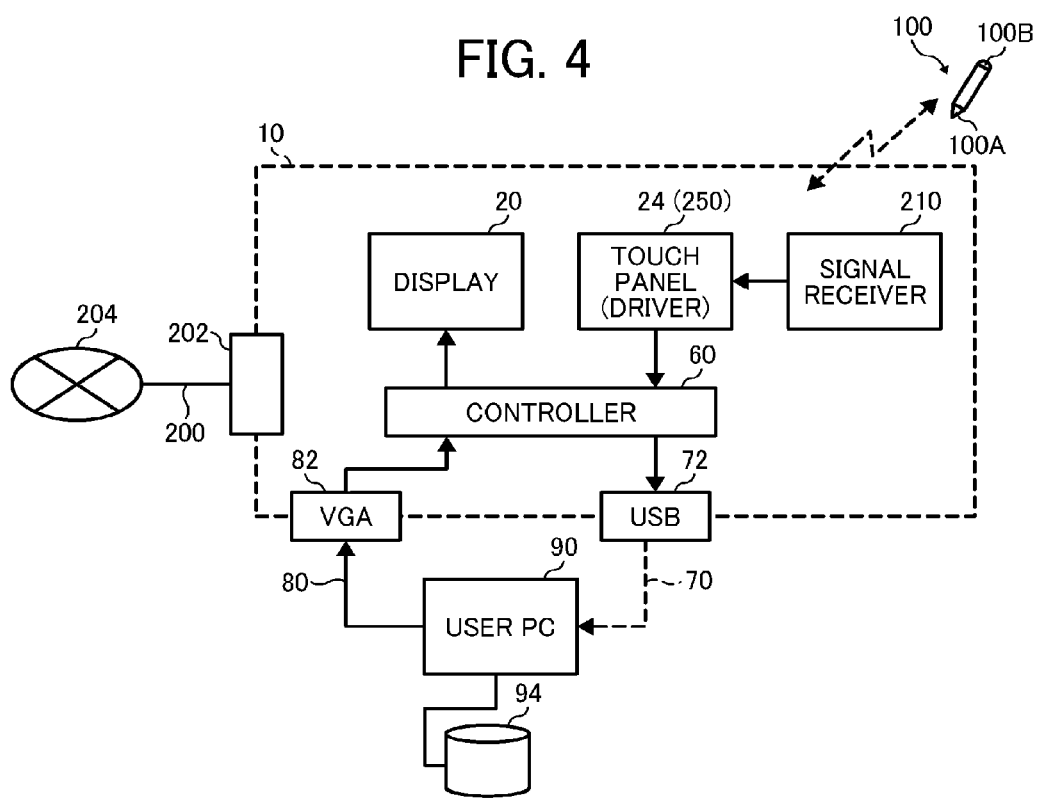

COMPARISON EXAMPLE

INPUT DEVICE, AND ELECTRONIC INFORMATION BOARD SYSTEM

CROSS-REFERENCE TO RELATED APPLICATION

This application claims priority pursuant to 35 U.S.C. §119(a) to Japanese Patent Application No. 2014-219161, filed on Oct. 28, 2014 in the Japan Patent Office, the disclosure of which is incorporated by reference herein in its entirety.

BACKGROUND

Technical Field

The present invention relates to an input device, and an electronic information board system employing the input device.

Background Art

Typically, electronic information board systems can be configured with an electronic pen used as a drawing or writing device, and a display. Text, characters and figures can be written and displayed on the display by contacting one end of the electronic pen on the display, in which a contact of the electronic pen and the display is required to be detected to display images written on the display. For example, the electronic pen includes, a pen end object that can move reciprocally along the axis direction of the electronic pen, and a pressure switch to be pressed when the pen end object moves into a rearward direction of the electronic pen. Specifically, when the pen end object contacts the display and then the pressure switch is pressed, a contact of the pen end object and the display can be detected.

However, conventional electronic pens including the pressure switch cannot detect the contact of the electronic pen and the display under some situations. For example, even if the electronic pen contacts the display, if the pen end object does not move along the axis direction with a distance enough to press the pressure switch, the contact of the pen end object and the display cannot be detected. Therefore, if the writing pressure of the electronic pen decreases during the drawing operation, the contact of the pen end object and the display cannot be detected even if the pen end object of the electronic pen contacts the display.

SUMMARY

As to the one aspect of the present invention, an input device is devised. The input device includes a casing, a moveable unit, disposed in the casing, including a spherical object and a rotation detector for detecting a rotation of the spherical object contactable on a display face, and a transmitter, disposed in the casing, to receive a rotation detection signal from the rotation detector and to transmit the rotation detection signal when the rotation detector detects the rotation of the spherical object.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 3 is a schematic view of a main section of the electronic information board system;

FIG. 4 is a block diagram of a control system of the electronic information board system;

Figure 1:
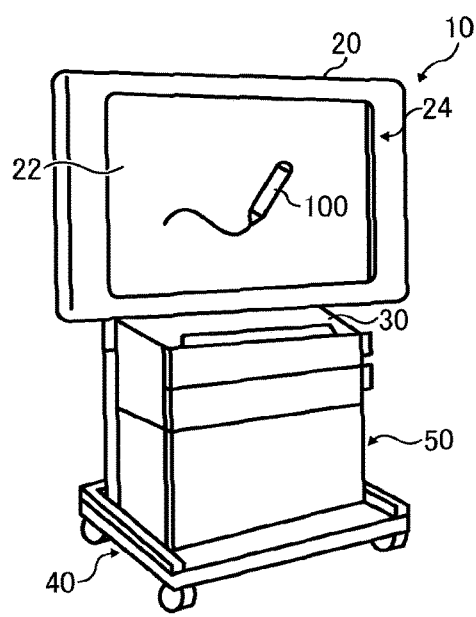
FIG. 1 is a schematic perspective view of an electronic information board system employing an input device according to one or more example embodiments.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to an example embodiment is described hereinafter.

As to conventional input devices used for drawing handwriting images on a display face of an electronic information board system, a contact of the input device and the display face can be detected by detecting a rearward movement of a front-end object of the input device into a casing of the input device. However, if writing pressure of the input device decreases during the drawing, the contact of the input device and the display face may not be detected, and handwriting images are not displayed on the display face, which means an interruption of the drawing occurs.

As to an input device of one or more example embodiments of the present invention, the input device can be configured with a spherical object as a front end object disposed at a front end of the input device, and a rotation detector to detect the rotation of the spherical object. A contact of the input device and the display face can be detected based on a detection result of the rotation detector. With this configuration, even if the front end object of the input device is not moved into the rearward direction in the casing of the input device due to the decreased writing pressure, by detecting the rotation of the spherical object contacting the display face, the contact of the input device and the display face can be detected effectively without interruption. A description is now given of exemplary embodiments of the present invention with reference to drawings.

(Configuration of Electronic Information Board System)

FIG. 1 is a schematic perspective view of an electronic information board system 10 employing an input device according to one or more example embodiments. The electronic information board system 10 is described as an example of electronic information systems. At first, an input device 100 known as an electronic pen having a pen-like shape is described as a related art because the input device 100 has some common parts to be used for an input device 400 according to an example embodiment of the present invention. As illustrated in FIG. 1, the electronic information board system 10 includes, for example, a display 20, a stand 40, and a device container 50. The display 20 is, for example, a flat panel such as a liquid crystal panel or plasma panel. The display 20 is configured with a display face 22 and a touch panel 24, used as a coordinate detector, disposed at a front side of the display 20. The display face 22 can be used to display images such as still images and movie images with or without audio or sound. Further, as to the electronic information board system 10, images such as text, characters and figures can be written on the display face 22 by contacting one end of the input device 100, used as a writing device, onto the touch panel 24.

When a front-end (i.e., writing end) of the input device 100 is contacted or pressed against the display face 22, the input device 100 outputs or transmits a writing-detection signal (i.e., contact-detection signal) as wireless signals (e.g., light signal such as infrared ray). When the display 20 receives the writing-detection signal transmitted from the input device 100, the display 20 displays characters and/or figures written at coordinate positions contacted by the input device 100 and then detected by the touch panel 24 on the display face 22.

Further, as to the input device 100, when a rear-end of the input device 100, which is another end of the input device 100, is contacted or pressed against the display face 22, the input device 100 outputs or transmits an erasing-detection signal (i.e., contact-detection signal) as wireless signals (e.g., light signal such as infrared ray). When the display 20 receives the erasing-detection signal transmitted from the input device 100, the display 20 erases characters and/or figures written at the coordinate positions detected by the touch panel 24 from the display face 22. When the erasing operation is conducted, a controller 60 (see FIGS. 3 and 4) performs processing that sets a color of detected coordinate positions with the same color of a background color (e.g., white). The device container 50 can encase various devices such as a printer and a video disk in addition to the controller 60 to be described later. Further, a keyboard 30 used for an inputting operation can be disposed on an upper side of the device container 50.

(Configuration of Input Device)

Figure 2:
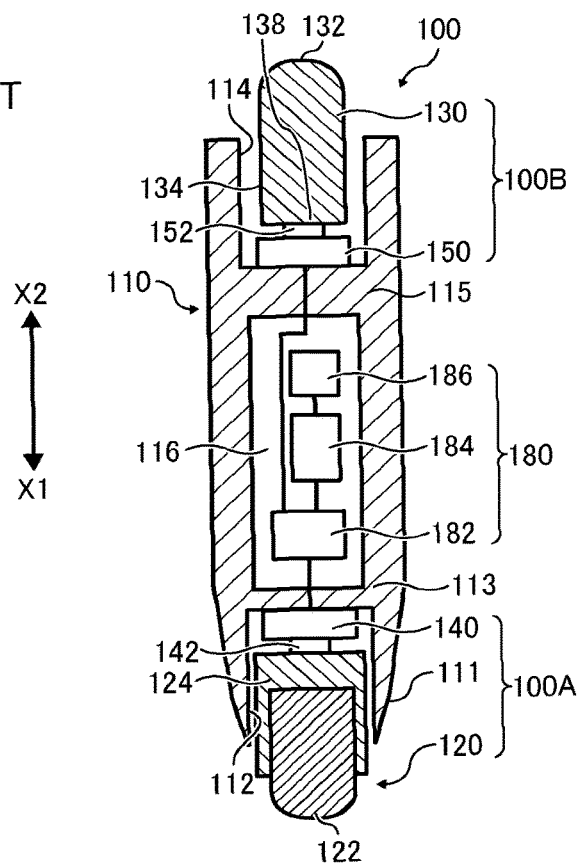
FIG. 2 illustrates a cross-sectional view of an input device of a related art.

A description is given of a configuration of the input device 100 of the related art with reference to FIG. 2, which can be used as a basic configuration of the input device 400 according to one or more example embodiments to be described later with reference to FIGS. 9 to 14. FIG. 2 illustrates a cross-sectional view of the input device 100 of the related art. As illustrated in FIG. 2, the input device 100 includes, for example, a casing 110 shaped into a cylinder, a writing unit 100A, and an erasing unit 100B. The writing unit 100A is disposed at one end of the casing 110, and the erasing unit 100B is disposed at another end of the casing 110 as illustrated in FIG. 2. The writing unit 100A includes, for example, a front-end moveable unit 120 and a front end detection switch 140 inside a front-end concave compartment 112 disposed at a front end of the casing 110. Further, the eraser unit 100B includes, for example, a rear-end moveable unit 130 and a rear end detection switch 150 inside a rear-end concave compartment 114 disposed at a rear end of the casing 110.

Each of the front-end detection switch 140 and the rear-end detection switch 150 employ, for example, a push switch. The front-end detection switch 140 includes a front-end moveable member 142 protruded along the axis direction of the casing 110, and the rear-end detection switch 150 includes a rear-end moveable member 152 protruded along the axis direction of the casing 110. The front-end moveable member 142 is spaced apart from the front-end moveable unit 120 with a tiny clearance, and the rear-end moveable member 152 is spaced apart from the rear-end moveable unit 130 with a tiny clearance.

When the front-end moveable unit 120 is moved for a given distance or more in the tiny clearance along the axis direction of the casing 110 (i.e., when the front-end moveable unit 120 is pressed toward the front-end concave compartment 112 along the axis direction), the front-end moveable member 142 is pressed, with which the front-end detection switch 140 is switched from OFF to ON, and a detection signal is output, which means the given distance is used as a distance that switches the front-end detection switch 140 from OFF to ON.

Further, when the rear-end moveable unit 130 is moved for a given distance or more in the tiny clearance along the axis direction of the casing 110 (i.e., when the rear-end moveable unit 130 is pressed inside toward the rear-end concave compartment 114 along the axis direction), the rear-end moveable member 152 is pressed, with which the rear-end detection switch 150 is switched from OFF to ON, and a detection signal is output, which means the given distance is used as a distance that switches the rear-end detection switch 150 from OFF to ON.

One end of the front-end detection switch 140 is fixed on a wall 113 formed at an inner bottom end in the front-end concave compartment 112. One end of the rear-end detection switch 150 is fixed on a wall 115 formed at an inner bottom end in the rear-end concave compartment 114.

Further, the front-end detection switch 140 includes a spring to press the front-end moveable member 142 protruded from an end to an off-position. Further, the rear-end detection switch 150 includes a spring to press the rear-end moveable member 152 protruded from an end to an off-position.

Further, the input device 100 includes, for example, a transmission circuit 180 (transmitter) in an internal space 116 of the casing 110. As illustrated in FIG. 2, the transmission circuit 180 includes, for example, a signal input unit 182, a signal processing unit 184, and a detection signal outputting unit 186. The signal input unit 182 is input with a detection signal from the front-end detection switch 140 and the rear-end detection switch 150. The signal processing unit 184 converts a detection signal input via the signal input unit 182 to a wireless signal. The detection signal outputting unit 186 outputs or transmits the wireless signal such as infrared ray generated at the signal processing unit 184. It should be noted that the wireless signals is not limited infrared ray, but other signals such as radio wave, light, sound wave can be used for the wireless signals.

(Electronic Information Board System)

FIG. 3 is a schematic view of devices configuring the electronic information board system 10. FIG. 4 is a block diagram of a control system of the electronic information board system 10. Hereinafter, a description is given of features of the electronic information board system 10.

As illustrated in FIGS. 3 and 4, the display 20 can be controlled by the controller 60, and the display 20 can display images received from a user PC 90 or a screen operation unit 26 used for instructing operations on the display face 22. Further, the controller 60 includes, for example, a universal serial bus (USB) port 72 and a video graphics array (VGA) input port 82 used for connecting with external connection terminals. The USB port 72 can be connected with a USB cable 70, and the VGA input port 82 can be connected with a VGA cable 80. Further, the user PC 90 can be connected to the controller 60 via the USB port 72 and the VGA input port 82 as illustrated in FIG. 3. Further, as illustrated in FIG. 4, the user PC 90 can be connected to a storage 94 such as a magnetic disk or the like that stores various programs such as various contents and contents-display applications or the like.

The user PC 80 includes a monitor 92 used for displaying an image. When a desired content is selected from the contents stored in the storage 94 by a user operation, the monitor 92 displays the selected content thereon. Therefore, when image data displayed on the monitor 92 of the user PC 90 is transmitted from the user PC 90 to the controller 60 via the USB cable 70 and the VGA cable 80, the controller 60 displays the same image displayed on the monitor 92 on a user-PC-image display area 28 on the display 20.

Further, the controller 60 can be connected to a network 204 such as the Internet or a local area network (LAN) via a communication line 200 (e.g., optical fiber) and a network port 202.

Further, as illustrated in FIG. 4, the electronic information board system 10 includes a signal receiver 210 that can receive a detection signal output or transmitted from the input device 100. Upon receiving a detection signal from the input device 100, the signal receiver 210 inputs the detection signal to the touch panel 24. With this configuration, a touch panel driver 250 (see FIG. 5) used as a control circuit of the touch panel 24 detects or recognizes that an input by the input device 100 is performed on the display face 22 based on the detection signal output from the input device 100, and outputs the detection signal to the controller 60.

(Control System of Electronic Information Board System)

Figure 5A:
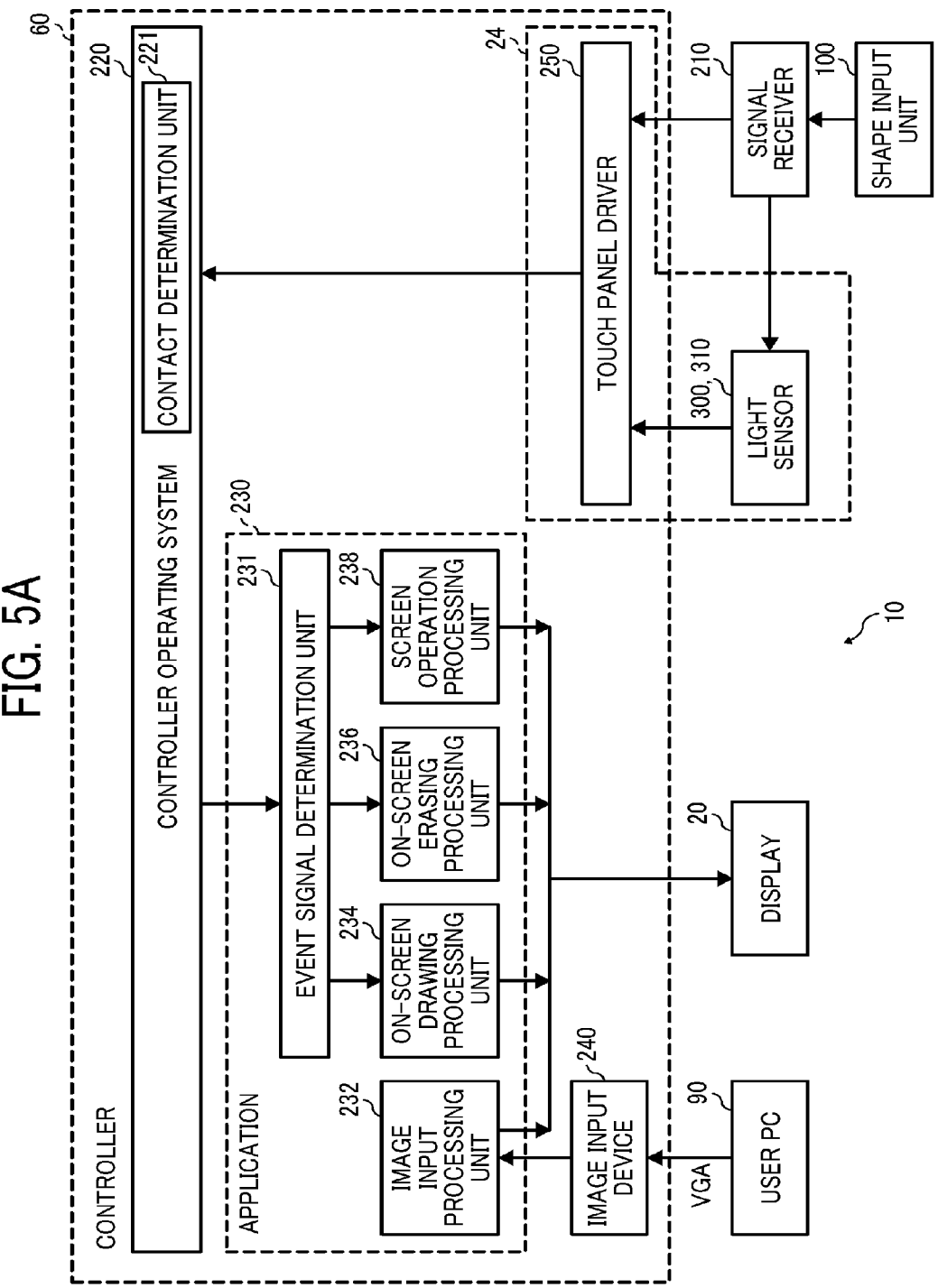
FIG. 5A is a block diagram of a controller of the electronic information board system.

FIG. 5A is a block diagram of the controller 60 of the electronic information board system 10. As illustrated in FIG. 5A, the controller 60 includes, for example, a controller operating system 220, an application system 230, an image input device 240, and a touch panel driver 250. Further, the application system 230 includes, for example, an event signal determination unit 231, an image input processing unit 232, an on-screen drawing processing unit 234, an on-screen erasing processing unit 236, and a screen operation processing unit 238.

The controller operating system 220 is a main controller that manages and executes control processing performed by the controller 60. The application system 230 performs various control processing such as a control of generating an image to be displayed on the display face 22 of the display 20, a control of displaying an image on the user-PC-image display area 28, and a control of displaying figures and characters when a writing detection signal by the input device 100 is detected. The event signal determination unit 231 monitors an event signal input from the controller operating system 220, and performs control processing corresponding to the input event signal. The image input processing unit 232 performs control processing for displaying an image, input from the user PC 90, on the user-PC-image display area 28 of the display face 22 of the display 20.

The on-screen drawing processing unit 234 generates a handwriting graphic image based on coordinate data of positions of the input device 100 on the touch panel 24, input via the event signal determination unit 231, and displays the handwriting graphic image on the display face 22 of the display 20. If an image is already displayed on the display face 22, the on-screen drawing processing unit 234 superimposes the handwriting graphic image on the image displayed on the display face 22 of the display 20.

Further, based on the coordinate data of positions on the touch panel 24, input via the event signal determination unit 231, the on-screen erasing processing unit 236 generates a graphic using a background color of a currently-displayed image, and superimposes the generated background color graphic on the image currently displayed on the display face 22 of the display 20. With this configuration, the background color graphic is superimposed on the handwriting graphic displayed on the display 20, with which the handwriting graphic can be erased from the display face 22 in appearance.

The screen operation processing unit 238 converts a coordinate position signal input from the touch panel 24 to a pointing device signal such as a mouse event, and performs processing based on an ON/OFF operation of the screen operation unit 26 displayed on the display face 22 of the display 21.

Further, the touch panel 24 includes a first sensor 300 and a second sensor 310 that emit light and receive reflection light reflected from an object, in which each of the first sensor 300 and second sensor 310 can be used as a light-emitting/receiving sensor. Information of contacting position coordinates of the input device 100 detected by first sensor 300 and the second sensor 310 of the touch panel 24 is transmitted to the controller operating system 220 with a coordinate value as a mouse-down event.

Further, when the input device 100 is moved while being contacted on the display face 22 of the touch panel 24, information of contacting position coordinates of the input device 100 is transmitted to the controller operating system 220 with a coordinate value as a mouse-up event.

The touch panel driver 250 converts a coordinate position signal, a writing detection signal, or an erasing detection signal, input from the input device 100 and the touch panel 24, to an event signal, and transmits the event signal to the controller operating system 220. Further, upon receiving a writing detection signal or an erasing detection signal from the input device 100 via the signal receiver 210, the touch panel driver 250 transmits or transfers the writing detection signal or the erasing detection signal to the controller operating system 220 with a coordinate position signal.

Figure 5B:
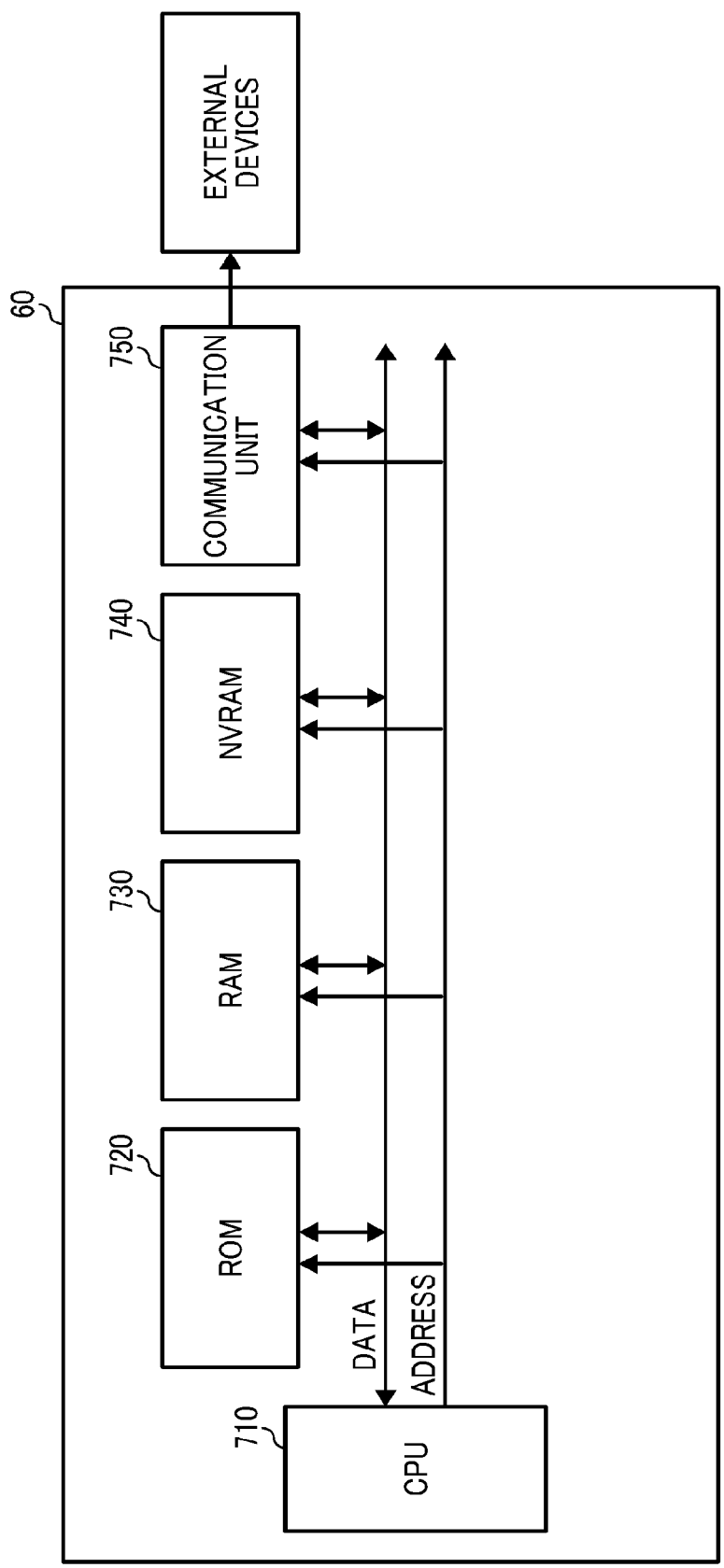
FIG. 5B is an example hardware configuration of the controller of the electronic information board system.

FIG. 5B is an example hardware configuration of the controller 60. The controller 60 includes, for example, a central processing unit (CPU) 710, a read only memory (ROM) 720, a random access memory (RAM) 730, a non-volatile RAM (NVRAM) 740, and a communication unit 750. The ROM 720 stores programs executable by the CPU 710. The RAM 7030 is used as a working memory when executing the programs. The NVRAM 740 stores data such as input data, and can retain data even when the power-supply is shutdown. The communication unit 750 is used to communicate with other external devices such as the user PC 90, the display 20, and the sensors 300 and 310. Each of functional units of the controller 60 can be devised as a hardware or a combination of software and hardware. Specifically, data can be stored in the RAM, and the CPU 710 processes the data using programs stored in the ROM 720 to devise each of functional units of the controller 60. Further, each of functional units of the controller 60 can be devised using a hardware programmed to execute the functional units of the controller 60.

(Method of Detecting Coordinates of Input Device)

Figure 6:
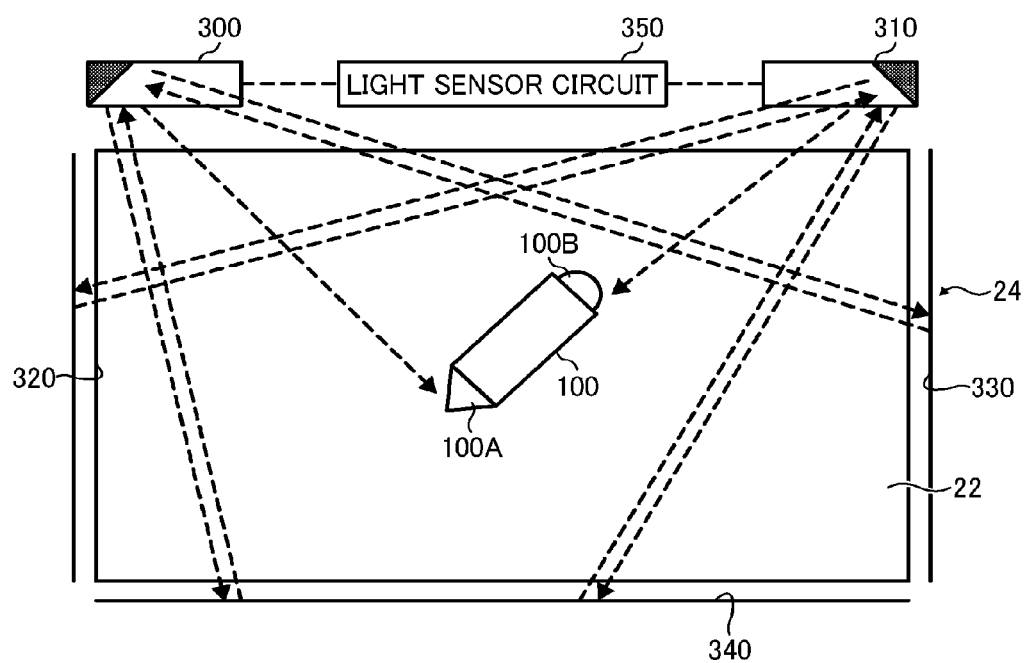
FIG. 6 is a schematic view of a touch panel used for detecting coordinate position of the input device.

FIG. 6 is a schematic view of the touch panel 24 used for detecting coordinate position of the input device 100. With reference to FIG. 6, a method of detecting coordinates of the input device 100 on the electronic information board system 10 is described. As illustrated in FIG. 6, the touch panel 24 is disposed with the first sensor 300 above the upper-left corner of the display face 22, and the second sensor 310 above the upper-right corner of the display face 22. Further, the touch panel 24 is disposed with reflection plates 320, 330, and 340 respectively at the left, right and bottom sides of the display face 22 as illustrated in FIG. 6.

The first sensor 300 disposed above the upper-left corner radiates infrared ray (i.e., probe light) along a plane parallel to the display face 22, and a radiation direction of infrared ray is directed to a substantially entire area of the reflection plate 330 at the right side and the reflection plate 340 at the bottom side. Further, the second sensor 310 disposed above the upper-right corner radiates infrared ray (i.e., probe light) along a plane parallel to the display face 22, and a radiation direction of infrared ray is directed to a substantially entire area of the reflection plate 320 at the left side and the reflection plate 340 at the bottom side. When nothing touches or contacts the display face 22, the infrared ray radiated from the first sensor 300 and the second sensor 310 is reflected at the reflection plates 320, 330, 340, and the reflection light is received by the first sensor 300 and the second sensor 310.

By contrast, when the front-end moveable unit 120 or the rear-end moveable unit 130 of the input device 100 contacts the display face 22, the infrared ray radiated from the first sensor 300 and the second sensor 310 is blocked by the input device 100 contacting the display face 22. Therefore, a sensor circuit 350 detects an angle with respect to the horizontal direction at a position where the infrared ray is blocked based on detection signals from the first sensor 300 and the second sensor 310, and computes coordinate positions using a formula of the fundamental of triangulation, and then converts the coordinate positions to X-Y coordinates. Then, coordinate position signals obtained by the sensor circuit 350 are input to the controller 60 via the touch panel driver 250. Then, upon receiving the process by the controller operating system 220, the coordinate position signals are transferred to the on-screen drawing processing unit 234, the on-screen erasing processing unit 236, and the screen operation processing unit 238.

(Operation of Input Device)

Figure 7A:
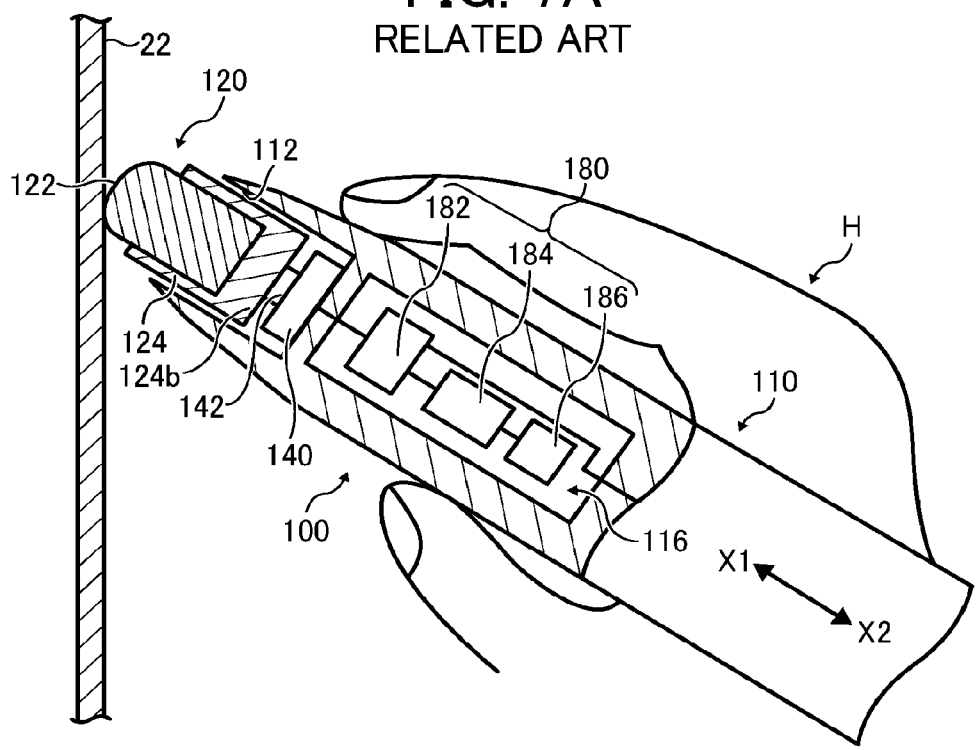
FIG. 7A is a schematic view of the input device when a writing unit of the input device is contacted on a display face.
Figure 7B:
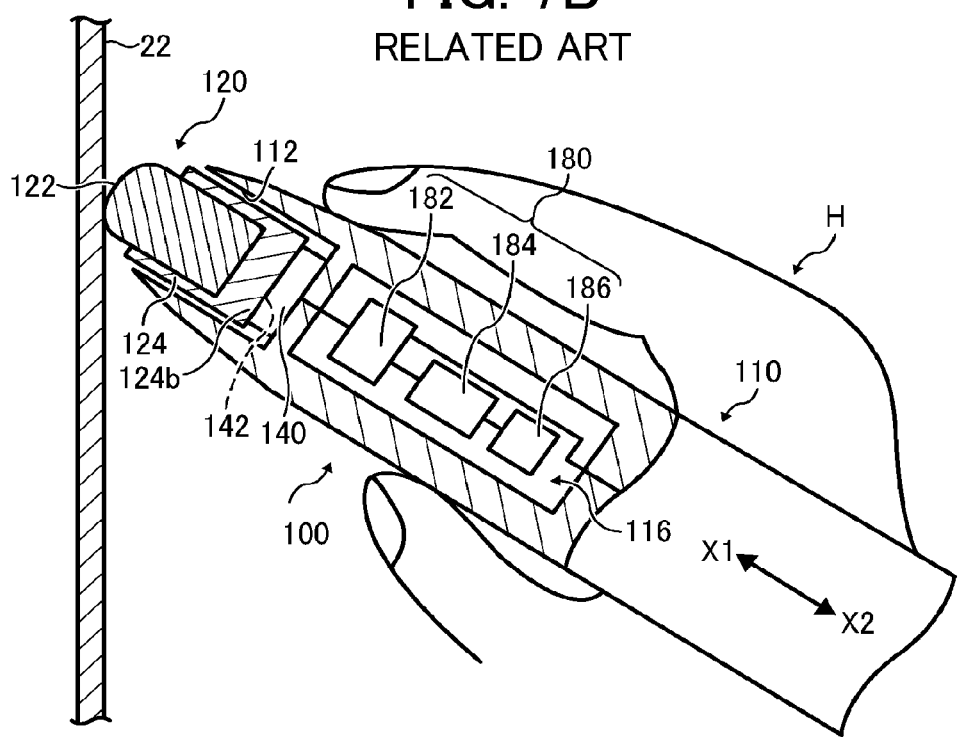
FIG. 7B is a schematic view of the input device when the writing unit of the input device is contacted on the display face and a front end object of the input device is further pressed into the casing of the input device.

FIG. 7A is a schematic view of the input device 100 when the writing unit 100A (FIG. 2) of the input device 100 is contacted on the display face 22, and FIG. 7B is a schematic view of the input device 100 when the writing unit 100A of the input device 100 is contacted on the display face 22 and a front end object of the input device 100 is further pressed into the casing 110 of the input device 100.

As illustrated in FIG. 7A, a user or operator holds the casing 110 with a hand H when operating the input device 100. For example, the hand H holds a middle of the casing 110 along the axis direction, and a front end object 122 of the front-end moveable unit 120 of the input device 100 is contacted to the display face 22 of the display 20, and the casing 110 is pressed against the display face 22 into a direction indicated by an arrow X1 in FIG. 7A. In this configuration, the front-end moveable unit 120 slides into the X2 direction in the concave compartment 112 of the casing 110, and a press member 124b of a front-end retaining member 124 presses the moveable member 142 to set the front-end detection switch 140 at the ON position indicated in FIG. 7B, in which the front-end detection switch 140 is set ON, and a writing-detection signal is output from the input device 100. The writing-detection signal can be converted to a wireless signal by the transmission circuit 180, and output or transmitted as the wireless signal. In this configuration, when the input device 100 is moved while maintaining the front-end detection switch 140 at the ON position, handwriting characters and/or figures can be displayed on the display face 22 based on the contacting positions of the moved front-end moveable unit 120.

Figure 8:
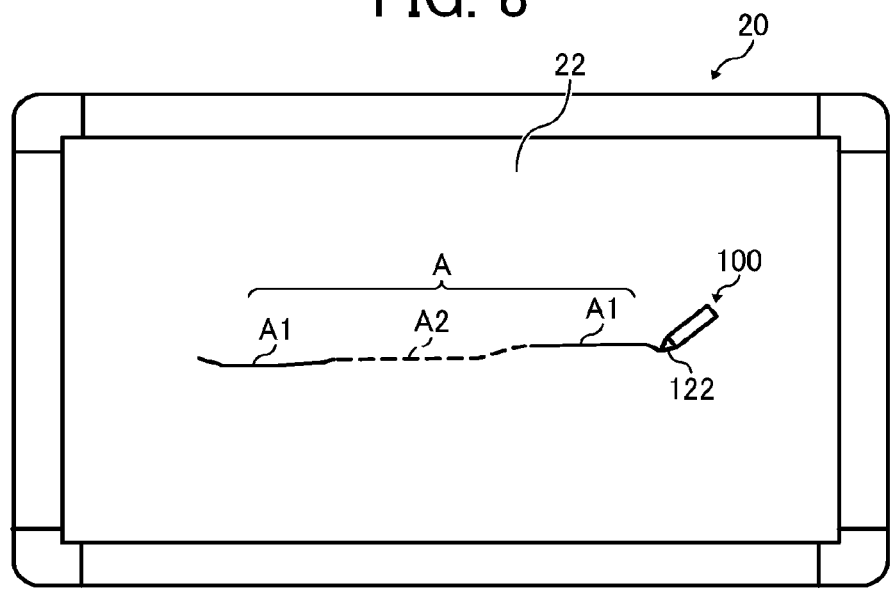
FIG. 8 is an example of images drawn on the display face by using the input device.

FIG. 8 is an example of images drawn on the display face 22 by using the input device 100. As illustrated in FIG. 7B, when the front end object 122 contacts the display face 22 and the front end detection switch 140 is set ON, a handwriting image A1 can be displayed on the display face 22 in a trajectory pattern A drawn by the front end object 122 as illustrated in FIG. 8.

However, when the front end object 122 contacts the display face 22 but the moveable member 142 is not pressed enough and effectively, and thereby the front end detection switch 140 is set OFF, a writing-detection signal is not output, and a handwriting image is not drawn on the display face 22 in the trajectory pattern A that is drawn by the front end object 122 as indicated by a not-drawn portion A2 in the trajectory pattern A. For example, when the writing pressure of handwriting image drawn by the user on the display face 22 is not enough, the handwriting image is not displayed at positions not intended by the user. Therefore, as to one or more example embodiments of the present invention, a front end object of the input device employs a spherical object that can freely rotate on the display face, and a writing-detection signal can be also output when a rotation of the spherical object on the display face is detected.

First Example Embodiment

Figure 9:
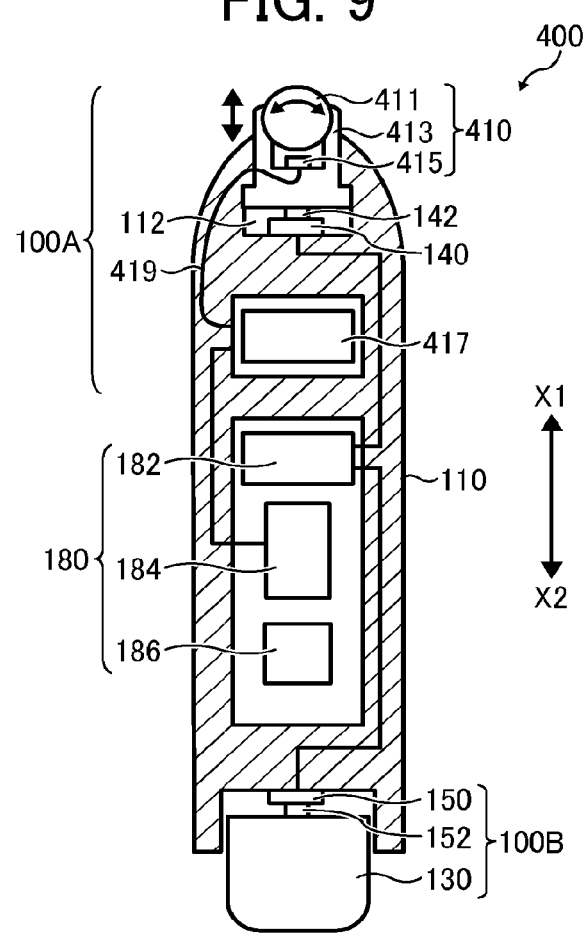
FIG. 9 is a cross sectional view of an input device according to a first example embodiment of the present invention.

FIG. 9 is a cross sectional view of an input device 400 according to a first example embodiment of the present invention. The parts same as the input device 100 (FIG. 2) are assigned with the same references, and the explanation of the same parts is omitted. The input device 400 includes the writing unit 100A having a front-end moveable unit 410. The front-end moveable unit 410 includes, for example, a front end object 411, a front end object holder 413, and a rotation detecting sensor 415 used as a rotation detector. The front end object 411 is, for example, a spherical object such as a ball, made of for example resin, which can freely rotate when the spherical object is contacting the display face 22 of the display 20 (FIG. 1). The front end object holder 413 holds the front end object 411 by allowing free rotation of the front end object 411, and the front end object holder 413, supported in the front-end concave compartment 112, can move reciprocally along the axis direction of the casing 110 ("X1-X2" direction). The rotation detecting sensor 415 is disposed in the front end object holder 413 to detect the rotation of the front end object 411.

Further, the writing unit 100A includes, for example, a signal receiver 417 that receives a detection signal from the rotation detecting sensor 415. Since the front end object holder 413 having the rotation detecting sensor 415 can move reciprocally along the axis direction, the rotation detecting sensor 415 and the signal receiver 417 are connected with each other by a signal cable 419 made of flexible material that does not break easily. The signal cable 419 can be wired with a pattern allowing some level of deformation in line with a movement of the front end object holder 413.

Figure 12A:
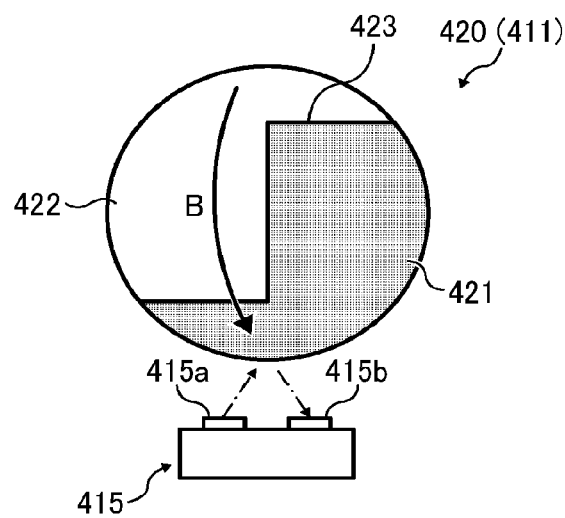
FIG. 12A is a schematic view of an arrangement of the front end object of FIG. 11A, and a rotation detecting sensor.

As illustrated in FIG. 12A, the rotation detecting sensor 415 includes, for example, a light emission unit 415a (light emitter) and a light detection unit 415b (light detector). The light emission unit 415a is, for example, a light emitting diode (LED) that emits light to a surface of the front end object 411. The light detection unit 415b is, for example, a photodiode that detects reflection light reflected from the front end object 411. The surface of the front end object 411 can be colored with, for example, white and black areas so that intensity of reflection light detected by the light detection unit 415b can be changed depending on the color on the surface of the front end object 411. For example, the rotation detecting sensor 415 outputs an ON signal when the light detection unit 415b detects reflection light reflected from the white area of the front end object 411, and an OFF signal when the light detection unit 415b detects reflection light reflected from the black area.

As to the first example embodiment, when the rotation detecting sensor 415 outputs the ON signal and OFF signal sequentially and alternately within a given time period, it is determined that the front end object 411 is rotating, which means the drawing by the input device 400 is being performed. The rotation detecting sensor 415 outputs the ON/OFF signals to the signal receiver 417. The ON/OFF signals received by the signal receiver 417 are converted to wireless signal (infrared light) by the signal processing unit 184, and then the detection signal outputting unit 186 transmits the wireless signal (infrared light) as a writing-detection signal (contact-detection signal).

Figure 10:
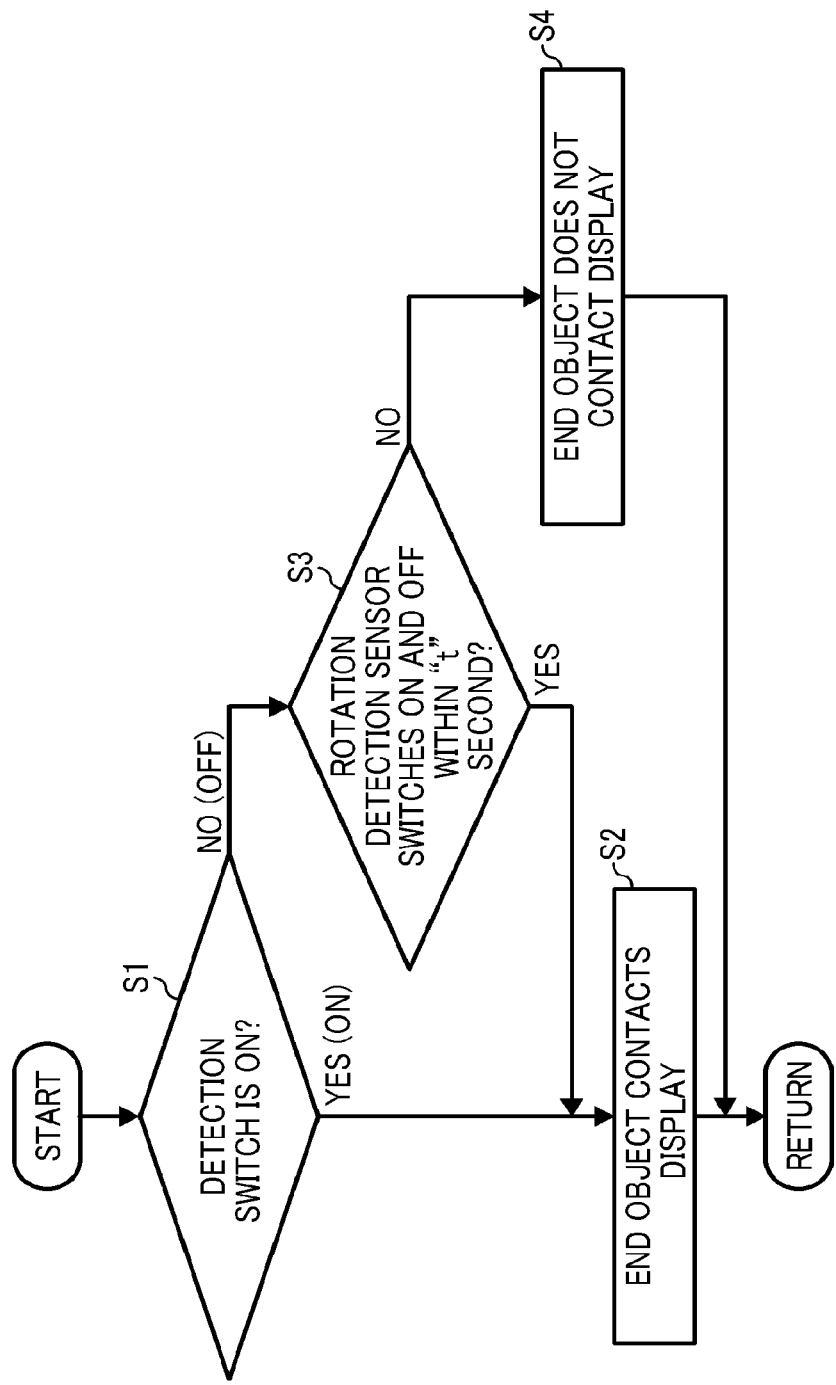
FIG. 10 is a flow chart showing the steps of determining a contact of a front end object of the input device on the display face performable by a contact determination unit.

A description is given of a process of determining a contact of the front end object 411 of the input device 400 on the display face 22. As illustrated in FIG. 5, the controller operating system 220 includes, for example, a contact determination unit 221 to determine whether the front end object 411 of the input device 400 contacts on the display face 22. FIG. 10 is a flow chart showing the steps of determining the contact of the front end object 411 of the input device 400 on the display face 21 performable by the contact determination unit 221. The contact determination unit 221 performs the contact determination processing based on a writing-detection signal transmitted from the detection signal outputting unit 186 of the input device 400.

At step S1, the contact determination unit 221 receives a writing-detection signal transmitted from the input device 400, and determines whether the writing-detection signal includes an ON signal of the front end detection switch 140. If the writing-detection signal includes the ON signal of the front end detection switch 140 (step S1: YES), the contact determination unit 221 determines that the front end object 411 contacts the display face 22 and the drawing is being performed. Then, the contact determination unit 221 sets a status value indicating a contact of the front end object 411 of the input device 400 on the display face 22 (step S2), and ends the contact determination processing. Then, the on-screen drawing processing unit 234 performs various controls such as displaying text, characters and figures written on the display face 22.

If the writing-detection signal does not include the ON signal of the front end detection switch 140 (step S1: NO), the sequence proceeds to step S3. At step S3, the contact determination unit 221 determines whether the signals transmitted from the rotation detecting sensor 415, included in the writing-detection signal, change or switch ON and OFF within a given time period such as within "t" seconds. If the contact determination unit 221 determines that the signals from the rotation detecting sensor 415 change or switch the ON/OFF within the given time period (step S3: YES), the contact determination unit 221 determines that the front end object 411 contacts the display face 22 and the drawing is being performed. Then, the contact determination unit 221 sets a status value indicating a contact of the front end object 411 of the input device 400 on the display face 22 (step S2), and ends the contact determination processing. Then, the on-screen drawing processing unit 234 performs various controls such as displaying text, characters and figures written on the display face 22.

By contrast, if the contact determination unit 221 determines that the signals from the rotation detecting sensor 415 do not change or switch the ON/OFF within the given time period (step S3: NO), the contact determination unit 221 determines that the front end object 411 does not contact the display face 22, which means the drawing is not performed. The contact determination unit 221 sets a status value indicating no-contact of the front end object 411 of the input device 400 on the display face 22 (step S4), and ends the contact determination processing, in which text, characters and figures are not drawn on the display face 22 by the input device 400.

As to the above described contact determination processing, even if the front end detection switch 140 is set OFF, by detecting a rotation of the front end object 411 caused by the drawing operation by the input device 400, it can be determined that the front end object 411 contacts the display face 22. With this configuration, even if the writing pressure decreases during the drawing and the front end detection switch 140 becomes OFF, handwriting images can be drawn without interruption.

Figure 11A:
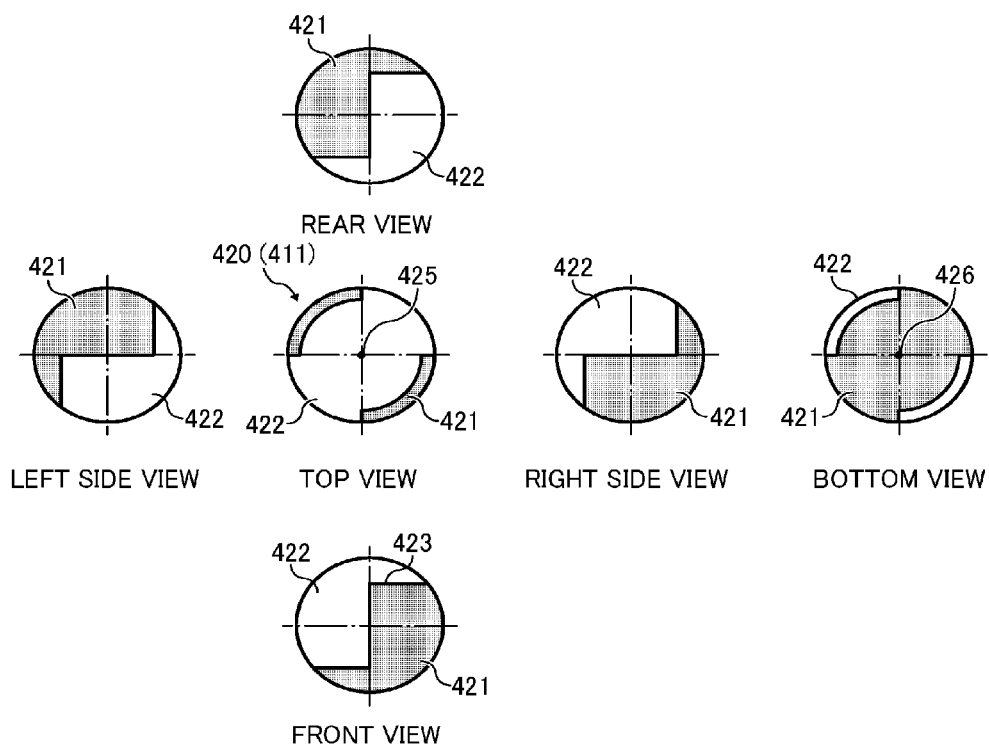
FIG. 11A is six-sided views of an example of the front end object of the input device of FIG. 9.
Figure 11B:
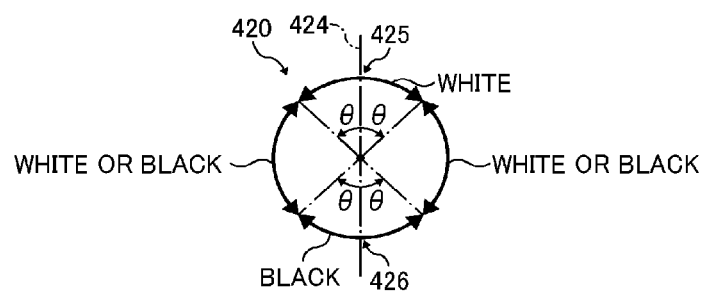
FIG. 11B is a cross-sectional view of the front end object of FIG. 11A.

A description is given of an example of the front end object 411 with reference to FIG. 11, in which the front end object 411 is referred to a front end object 420. FIG. 11A is six-sided views of the front end object 420 of the input device 400 of FIG. 9, and FIG. 11B is a cross-sectional view of the front end object 420 of FIG. 11A. The front end object 420 is formed of resin having stiffness, and the front end object 420 has a surface set with a plurality of areas such as two areas of a first area 421 and a second area 422, which are adjacent areas.

The first area 421 has a first reflection ratio for light emitted from the light emission unit 415a, and the second area 422 has a second reflection ratio for the light emitted from the light emission unit 415a, in which the first reflection ratio and second reflection ratio are set differently. The light detection unit 415b can detect light having a wavelength range reflected from the first area 421 and light having another wavelength range reflected from the second area 422.

The first area 421 and the second area 422 are adjacent with each other by setting a boundary line 423 as illustrated in FIG. 11A. The first area 421 and the second area 422 are set on the front end object 420 with any patterns as long as the first area 421 and the second area 422 can be detected by the rotation detecting sensor 415 sequentially and alternately when the input device 400 is moved in any one of directions on the display face 22 while contacting the front end object 420 on the display face 22 (FIG. 1).

Hereinafter, as illustrated in FIG. 11B, the front end object 420 has an axis line 424, and pole points such as an upper pole point 425 and a lower pole point 426. The axis line 424 passes the center of the front end object 420 and extends in the upper and lower directions. The upper pole point 425 is a cross point of the axis line 424 and the surface of the front end object 420. The lower pole point 426 is another cross point of the axis line 424 and the surface of the front end object 420. The direction that circles the axis line 424 is set as the circling direction.

As to the front end object 420, an area defined by the upper pole point 425 (center point) and a given solid angle "θ" range is colored with white, and an area defined by the lower pole point 426 (center point) and a given solid angle "θ" range is colored with black, and other areas are equally segmented into equal-size segments in the circling direction, and each of the segments is alternately colored with white and black. With this configuration, the surface area of the front end object 420 is segmented into two areas, which are point symmetry about the center of the spherical object, and the first area 421 is colored with black, and the second area 422 is colored with white.

Figure 12B:
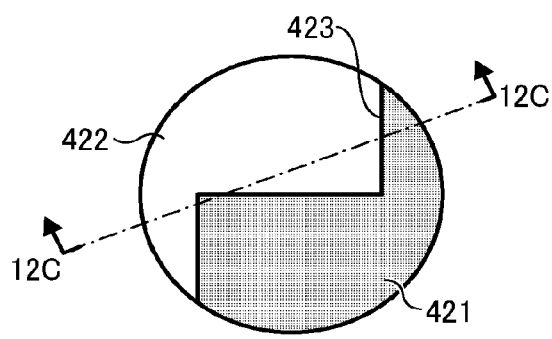
FIGS. 12B and 12C illustrate an example view of cutting the front end object of FIG. 12A by a plane passing the center of the front end object.
Figure 12C:
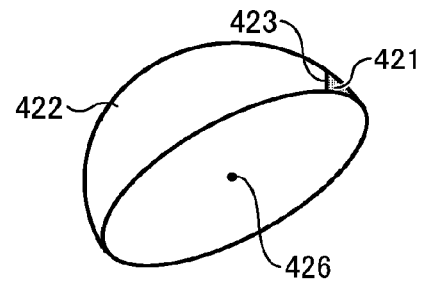
Figure 13:
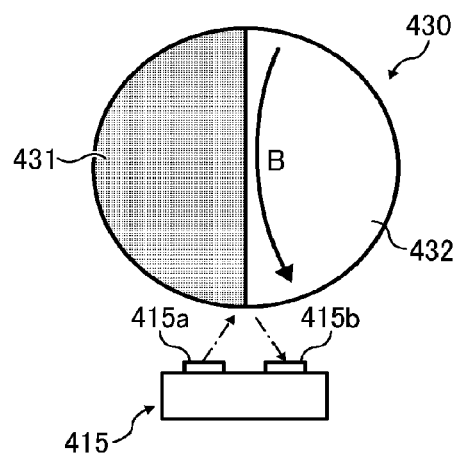
FIG. 13 is a schematic view of an arrangement of a front end object and the rotation detecting sensor of a comparison example.

FIG. 12 is a schematic view of the front end object 420 (FIG. 11) and the rotation detecting sensor 415 of the first example embodiment, and FIG. 13 is a schematic view of a front end object 430 and the rotation detecting sensor 415 of a comparison example. As illustrated in FIG. 13, a left hemisphere 431 of the front end object 430 is colored with black, and a right hemisphere 432 of the front end object 430 is colored with white, in which the left hemisphere 431 and the right hemisphere 432 are symmetrical. As above described, if the rotation detecting sensor 415 cannot detect the white area and the black area sequentially, which means if it cannot output ON/OFF signals sequentially, the rotation of the front end object 411 cannot be detected. If the front end object 430 constantly rotates in a direction indicated by an arrow "B" in FIG. 13 during the drawing operation, the rotation detecting sensor 415 may detect only one of the left hemisphere 431 and the right hemisphere 432, and thereby the rotation detecting sensor 415 cannot detect the rotation of the front end object 430. By contrast, as to the first example embodiment illustrated in FIG. 12, when the front end object 420 constantly rotates in a direction indicated by an arrow "B" in FIG. 12A, the rotation detecting sensor 415 can sequentially detect the first area 421 (black) and the second area 422 (white). Therefore, the rotation detecting sensor 415 can detect the rotation of the front end object 420.

As illustrated in FIG. 12A, the first area 421 and the second area 422 form the boundary line 423 between the first area 421 and the second area 422 on the front end object 411. The boundary line 423 is set with a pattern having a size and a shape that the boundary line 423 can be detected by the rotation detecting sensor 415 when the input device 400 is moved in any directions on the display face 22. Specifically, the boundary line 423 is set with a pattern that the boundary line 423 is cut by a plane passing the center 426 of the front end object 420 (spherical object) when the front end object 420 is cut by the plane, with which the rotation of the front end object 420 can be detected by the rotation detecting sensor 415 when the input device 400 is moved in any one of directions on the display face 22 while contacting the front end object 420 on the display face 22. FIGS. 12B and 12C illustrate an example view of cutting the front end object 411 by the plane passing the center 426 of the front end object 420, in which the boundary line 423 of the first area 421 and the second area 422 is cut by the plane, which means the boundary line 423 crosses the circumference of the front end object 420.

Figure 14A:
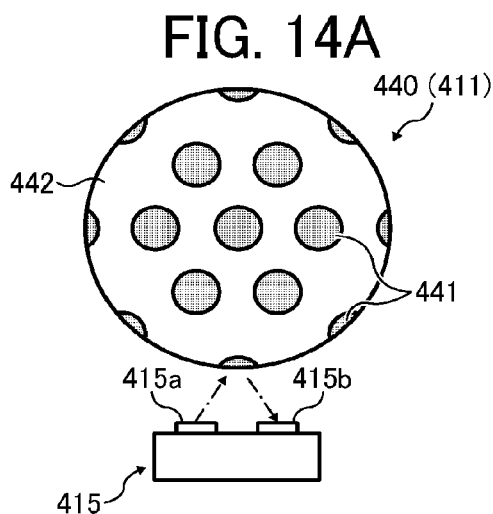
FIG. 14A is a schematic view of another example of the front end object.

FIG. 14A is a schematic view of another example of the front end object 411, in which the front end object 411 is referred as a front end object 440. Specifically, the front end object 440 has a surface having two areas such as a plurality of first areas 441 (e.g., circle area), and a second area 442 around the first areas 441, in which the plurality of first areas 441 is colored with black, and the second area 442 is colored with white. As illustrated in FIG. 14A, the first areas 441 and the second area 442 form the boundary line 443 between the first area 441 and the second area 442 on the front end object 440.

Figure 14B:
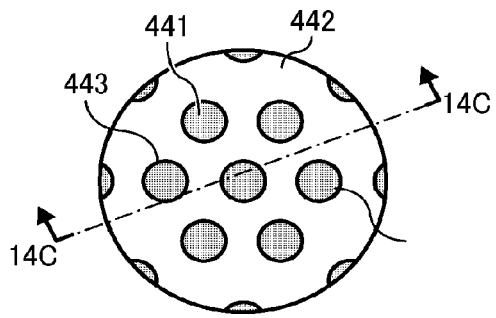
FIGS. 14B and 14C illustrate an example view of cutting the front end object of FIG. 14A by a plane passing the center of the front end object.
Figure 14C:
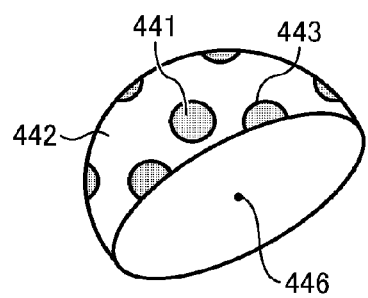

The boundary line 443 is set with a pattern having a size and a shape that the boundary line 443 can be detected by the rotation detecting sensor 415 when the input device is moved in any directions on the display face 22. Specifically, the boundary line 443 is set with a pattern that the boundary line 443 is cut by a plane passing the center 446 of the front end object 440 (spherical object) when the front end object 440 is cut by the plane, with which the rotation of the front end object 440 can be detected by the rotation detecting sensor 415 when the input device 400 is moved in any one of directions on the display face 22 while contacting the front end object 440 on the display face 22. FIGS. 14B and 14C illustrate an example view of cutting the front end object 440 by the plane passing the center 446 of the front end object 440, in which the boundary line 443 of the first area 441 and the second area 442 is cut by the plane, which means the boundary line 443 crosses the circumference of the front end object 440. As illustrated in FIG. 14, the surface of the front end object 440 can be set with a plurality of areas such as three or more areas.

As to the above described example embodiments, when the front end object 411 employs the spherical object, and the contact of the front end object 411 on the display face 22 and the drawing of handwriting images are detected by detecting the rotation of the spherical object, the front end detection switch 140 (FIG. 9) can be omitted. However, when a point is drawn, the front end object 411 may not rotate while handwriting images are drawn. Therefore, the front end detection switch 140 may not be omitted from the input device 400.

The above described example embodiments can be applied to the writing unit 100A of the input device 100. Further, the above described example embodiments can be also applied to the eraser unit 100B of the input device 100.

The above described example embodiments can be implemented with various configurations.

(First Configuration)

As to the first configuration, the input device includes the moveable unit (front-end moveable unit 120, rear-end moveable unit 130) including the spherical object (front end object 411, rear end object) and the rotation detector (rotation detecting sensor 415) for detecting a rotation of the spherical object contacting on the display face 22, and the transmitter (transmission circuit 180) to transmit a signal (writing-detection signal, erasing-detection signal) when the rotation detector detects the rotation of the spherical object. With this configuration, even if the writing pressure decreases during the drawing operation, a contact-detection signal can be transmitted when the rotation detecting sensor detects the rotation of the spherical object. Therefore, the contact of the display face and the input device can be detected, and handwriting images can be drawn without interruption of the drawing under any conditions with or without detecting the writing pressure during the drawing operation.

(Second Configuration)

As to the second configuration of the input device, the spherical object has a surface set with at least a first area having a first reflection ratio, and a second area having a second reflection ratio different from the first reflection ratio, and the first area and the second area are set adjacently on the surface of the spherical object. In this configuration, the rotation detecting sensor 415 detects a movement of the surface of the spherical object by detecting the different areas based on differences of the reflection ratio, with which the rotation of the spherical object can be detected.

(Third Configuration)

As to the third configuration, the first area and the second area are set on the surface of the spherical object (front end object 411, rear end object) with a pattern so that the rotation detector detects the first area and the second area sequentially and alternately when the spherical object moves into any one of directions on the display face while being contacted on the display face. With this configuration, a detection error such as the rotation of the spherical object is not detected when a straight line is drawn can be prevented.

(Fourth Configuration)

As to the fourth configuration, the rotation detector (rotation detecting sensor 415) includes a light emitter (light emission unit 415a) to emit light to the surface of the spherical object (front end object 411, rear end object), and a light detector (light detection unit 415b) to detect reflection light reflected from the spherical object. With this configuration, the rotation of the spherical object can be detected with a simple and less expensive configuration.

(Fifth Configuration)

As to the fifth configuration, the moveable unit (front-end moveable unit 120, rear-end moveable unit 130), supported in the concave compartment (front-end concave compartment 112, rear-end concave compartment 114) can move reciprocally along the axis direction of the casing 110, and the detection switch is disposed in the concave compartment (front-end concave compartment 112, rear-end concave compartment 114). When the moveable unit moves for a given distance or more along the axis direction in the casing of the input device, the detection switch is pressed, and then the transmitter (transmission circuit 180) transmits a contact-detection signal (writing-detection signal, erasing-detection signal) indicating that the detection switch is pressed. With this configuration, even if the spherical object does not rotate when a point is drawn, the contact of the display face and the input device can be detected.

(Sixth Configuration)

As to the sixth configuration, the electronic information board system includes the display 20 having the display face 22 to which the input device 400 is contactable, the coordinate detector such as the touch panel 24 to detect coordinates of the input device 400 when the input device 400 contacts the display face 22, and the controller 60 to display an image based on the coordinates of the input device 400 on the display 20 detected by the coordinate detector. The electronic information board system can devise the effect of the above described first to five configurations.

As to the above described example embodiments, even if the writing pressure decreases during the drawing, a contact-detection signal can be transmitted when the rotation detecting sensor detects the rotation of the spherical object. Therefore, the contact of the display face and the input device can be detected under any conditions with or without detecting the writing pressure during the drawing operation.

Numerous additional modifications and variations are possible in light of the above teachings. It is therefore to be understood that, within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An input device comprising:
   a casing;
   a movable front-end supported in a concave compartment formed in the casing and being reciprocally movable along an axis direction of the casing, the movable front-end including a rotation detector to detect a rotation of a front end object that can rotate on a display face when the front end object contacts the display face and to output a rotation detection signal;
   a transmitter, disposed in the casing, to receive the rotation detection signal from the movable front-end and to transmit the rotation detection signal as a writing-detection signal; and
   a detection switch, disposed in the casing, to detect pressing when the movable front-end moves for a given distance or more along the axis direction of the casing and to output a pressing-detection signal, wherein the transmitter transmits the pressing-detection signal and the rotation detection signal as the writing-detection signal, wherein an entire outer surface of the front end object is divided into a first area having a first reflection ratio and a second area having a second reflection ratio different from the first reflection ratio, and the first area and the second area are set adjacently on the surface of the front end object, and wherein the front end object is a spherical object.

2. The input device of claim 1, wherein the first area and the second area are set on the surface of the front end object with a pattern so that the rotation detector detects the first area and the second area sequentially and alternately when the front end object moves into any one of directions on the display face while being contacted on the display face.

3. The input device of claim 1, wherein the rotation detector includes a light emitter to emit light to the surface of the front end object; and a light detector to detect reflection light reflected from the front end object irradiated by the light emitted by the light emitter.

4. An electronic information board system comprising:
the input device of claim 1;
a display including a display face to which the input device is contactable;
a coordinate detector to detect coordinates of the input device when the input device contacts the display face; and
a controller to display an image based on the coordinates of the input device on the display face detected by the coordinate detector.

5. The input device of claim 1, wherein the spherical object has a top circular surface, a bottom circular surface, and four lateral quadrant surfaces, the first area includes the top circular surface and two oppositely-located lateral quadrant surfaces, the second area includes the bottom circular surface and the other two oppositely-located lateral quadrant surfaces.

6. The input device of claim 5, wherein a portion of a perimeter of the top circular surface intersects a radial line of the spherical object forming a predetermined angle e with a vertical axis at a center of the spherical object, and a portion of a perimeter of the bottom circular surface intersects the radial line of the spherical object forming the predetermined angle θ with the vertical axis at the center of the spherical object.

7. An input device comprising:
a casing;
a moveable end, disposed in the casing, including a spherical object and a rotation detector to detect a rotation of the spherical object contactable on a display face; and
a transmitter, disposed in the casing, to receive a rotation detection signal from the rotation detector and to transmit the rotation defection signal when the rotation defector detects the rotation of the spherical object, wherein an entire outer surface of the spherical object is divided into a first area having a first reflection ratio and a second area having a second reflection ratio different from the first reflection ratio, and the first area and the second area are set adjacently on the surface of the spherical object, wherein the spherical object has a top circular surface, bottom circular surface, and four lateral quadrant surfaces, the first area includes the top circular surface and two oppositely-located lateral quadrant surfaces, the second area includes the bottom circular surface and the other two oppositely-located lateral quadrant surfaces, and wherein a portion of a perimeter of the top circular surface intersects a radial line of the spherical object forming a predetermined angle θ with a vertical axis at a center of the spherical object, and a portion of a perimeter of the bottom circular surface intersects the radial line of the spherical object forming the predetermined angle θ with the vertical axis at the center of the spherical object.

8. An input device comprising:
a casing;
a moveable end which is disposed in the casing and is moveable along an axis direction of the casing, the moveable end including only one spherical object and a rotation detector to detect a rotation of the spherical object contactable on a display face;
a transmitter, disposed in the casing, to receive a rotation detection signal from the rotation detector and to transmit the rotation detection signal when the rotation detector detects the rotation of the spherical object; and
a detection switch, disposed in the casing, to detect pressing when the moveable end moves for a given distance or more along the axis direction of the casing and to output a signal that the detection switch is pressed, wherein the detection switch is to he actuated by movement of the moveable end, wherein an entire outer surface of the spherical object is divided into a first area having a first reflection ratio and a second area having a second reflection ratio different from the first reflection ratio, and the first area and the second area are set adjacently on the surface of the spherical object, and wherein the first area and the second area are equal.

9. The input device of claim 8, wherein the spherical object has a top circular surface, a bottom circular surface, and four lateral quadrant surfaces, the first area includes the top circular surface and two oppositely-located lateral quadrant surfaces, the second area includes the bottom circular surface and the other two oppositely-located lateral quadrant surfaces.

* * * * *